United States Patent Office 3,031,073
Patented Apr. 24, 1962

3,031,073
MANUFACTURE OF MERCAPTOBENZOTHIAZOLE
Leslie Szlatinay, St. Albans, W. Va., assignor to Monsanto Chemical Company, St. Louis, Mo., a corporation of Delaware
No Drawing. Filed May 1, 1959, Ser. No. 810,269
1 Claim. (Cl. 260—306)

The present invention relates to the manufacture of mercaptobenzothiazole and particularly to improvements in manufacture of mercaptobenzothiazole by the Kelly process.

The preparation of mercaptobenzothiazole from aniline, sulfur and carbon bisulfide was described in U.S. Patent 1,631,871, granted to Kelly June 7, 1927. Usually these reactants are heated above 200° C. under pressure. This is the method most generally used for industrial manufacture. However, the product contains a number of impurities which it is necessary for most purposes to remove. These include unreacted raw materials, benzothiazole, hydrogen sulfide and unidentified tars. In the past the reaction has been regarded as an equilibrium reaction involving by-product tars and it was proposed to charge tars in addition to the usual reactant quantities to minimize formation of further by-products. This expedient was believed to permit the reaction to proceed more nearly to completion. Accordingly, reaction time cycles were kept long enough to drive the reaction nearly to completion whereas shorter time cycles would be very advantageous if loss of material could be minimized. It has now been found that these tars are actually precursors of mercaptobenzothiazole. They can be used in place of fresh reactants. Moreover, the reaction time is not critical and may be adjusted as convenient within quite wide limits and residue remaining after separating the mercaptobenzothiazole recycled.

An object of this invention is to improve the formation and isolation of mercaptobenzothiazole. Another object is to recover constituents which are suitable reactants or intermediates for the production of mercaptobenzothiazole. A further object is to provide a simple economical process for the manufacture of high quality mercaptobenzothiazole. A particular object is to provide a process for the use of impurities recovered from mercaptobenzothiazole for the manufacture of further quantities of mercaptobenzothiazole. Another particular object is to provide a manufacturing method which reduces or avoids the consumption of chemical purification adjuvants.

In accordance with this invention the crude product from the condensation of aniline, sulfur and carbon bisulfide is separated into mercaptobenzothiazole and residue. The aniline and sulfur equivalent of the residue are determined as hereinafter described and the residue used in the condensation to produce further quantities of mercaptobenzothiazole. Any method for isolating mercaptobenzothiazole from the crude reaction product is suitable in the practice of the present process with the restriction that the method be one which permits recovery of the residue as well as the mercaptobenzothiazole. This residue will be hereinafter referred to as "tars."

A convenient purification step comprises dispersing the crude reaction product from the Kelly process in an emulsion of a water immiscible organic solvent in water and then removing the solvent from the organic solution phase and recharging the tars to the autoclave with fresh reactants. According to this purification procedure, which is described in detail in my application Serial No. 810,247, filed of even date herewith, the proportion of organic solvent will be less than the water. Suitable solvents comprise monochlorobenzene, orthodichlorobenzene, toluene, benzene, carbon bisulfide and perchloroethylene. Fine particle size enhances the effectiveness of the separation of the residue from mercaptobenzothiazole. This may be achieved by gradually adding crude molten mercaptobenzothiazole to vigorously agitated hot water in the presence of a surface active agent followed by addition of the organic solvent and continued stirring in the presence of the resulting emulsion. Alternatively, crude mercaptobenzothiazole is added to a preformed emulsion and heated and stirred therein at temperatures up to about 175° C.

As indicated, the presence of a surface active agent in emulsification purification is desirable. Examples comprise sodium dodecylbenzenesulfonate, sodium decylbenzenesulfonate, dibutyl ammonium dodecylbenzenesulfonate, alkali metal salts of sulfated fatty alcohols, alkali metal soaps, more particularly sodium or potassium soaps of higher fatty acids or ethylene oxide condensation products of diverse materials. These include alkyl phenols, tall oil, higher mercaptans and higher alcohols, all of which are used as raw materials for preparation of nonionic surface active agents by condensation with ethylene oxide. Products obtained by condensing 100 parts of tall oil with 140–160 parts by weight ethylene oxide are examples of nonionic wetting agents available. Another example is the condensation product of one mole of oleic acid with 10–15 moles of ethylene oxide. Still others are condensation products of one mole of octyl, nonyl, decyl, undecyl, or dodecyl mercaptan with 7–15 moles of ethylene or propylene oxide. If an anionic wetting agent is selected, it is desirable to adjust the pH of the wash liquors to 3 to 4 before filtration. On the other hand, no acidification is necessary if a nonionic surface active agent is selected. The selection of a nonionic surface active agent has the further advantage of reducing the foaming tendencies. Rapid stirring tends to promote foaming with anionic emulsifying agents whereas rapid stirring is otherwise desirable. Efficiency of stirring may be increased by passing a stream of air or other gas into the emulsion containing the mercaptobenzothiazole in which case a non-foaming surface active agent is a distinct advantage.

The ratio of the emulsion to crude mercaptobenzothiazole may vary considerably, being limited insofar as a minimum is concerned by the quantity which provides a fluid system that can be processed. The weight of the emulsion should at least equal the weight of crude mercaptobenzothiazole, otherwise the mixture becomes too thick and unwieldy to process satisfactorily. The organic solvent will usually be much less than the water. As little as 5 parts solvent per 300 parts by weight of water contributes to the separation of impurities.

Use of carbon bisulfide in emulsion for separation of the crude product or for extracting or recrystallizing the crude product minimizes the recovery problem because carbon bisulfide is one of the reactants. Thus it is feasible to charge to the autoclave the entire organic liquor fraction where carbon bisulfide is the solvent. Moreover, carbon bisulfide is a very efficient purification adjuvant and is admirably suited for the manufacture of very high quality mercaptobenzothiazole.

The production cycle when carbon bisulfide is used in an emulsification purification step assumes the following form: The crude mercaptobenzothiazole from the autoclave is treated with an emulsion of carbon bisulfide in water. The purified mercaptobenzothiazole is removed from the emulsion, then the emulsion broken, the organic layer separated and analyzed to determine the aniline and sulfur values. Neglecting operational losses, the quantity of carbon bisulfide is known from the amount charged. The carbon bisulfide and other volatiles are separated from the mother liquor and the weight of tars remaining determined. These tars are analyzed for their nitrogen content. An empirical formula which enables the calculation of the useful aniline content is the following:

$$\text{Aniline equivalent} = \frac{\text{grams of tar} \times N_2\% \times 12}{2 \times 100}$$

Similarly, an empirical formula for determining the sulfur equivalent of the mother liquor is the following:

$$\text{Sulfur} = \frac{\text{grams of tar} \times \text{percent free sulfur}}{2 \times 100}$$

The quantity of carbon bisulfide is, of course, known from the amount charged. The charges of fresh aniline, sulfur and carbon bisulfide are reduced by the amounts charged with the mother liquor to the autoclave. The cycle is then repeated as before. Good results are obtained by assuming all of the nitrogen comes from aniline and reducing the sulfur by the full amount of free sulfur contained in the tars according to the analysis but the results are somewhat better employing the foregoing formulae.

The process is illustrated by the following detailed examples:

Example 1

To a one liter autoclave equipped with a stirrer is charged 310 parts by weight of aniline, 109 parts by weight of sulfur and 304 parts by weight of carbon bisulfide. The mixture is heated to 245° C. and held there with agitation for about 5 hours. The pressure is reduced and the contents of the autoclave removed. The autoclave is recharged with 250 parts by weight of the crude product assaying 91.1% mercaptobenzothiazole and 375 parts by weight of carbon bisulfide. The autoclave is closed and the charge heated to 140° C. and held there for about 30-45 minutes. A pressure of 155-160 p.s.i. develops during the heating. The autoclave and contents are then cooled, stirring of the contents being continued during the cooling. The mercaptobenzothiazole which crystallizes from the liquors is removed by filtration, washed with 75 parts by weight of carbon bisulfide and dried. There is obtained 214 parts by weight of mercaptobenzothiazole assaying 99.5%. The free sulfur content is nil and other impurities are absent. The yield is 94%. The carbon bisulfide mother liquor is concentrated, analyzed and charged to the autoclave with more aniline and sulfur to produce further quantities of mercaptobenzothiazole as more particularly described in Example 2.

Example 2

To the autoclave described above 279 parts by weight of aniline, 98 parts by weight of sulfur and 374 parts by weight of carbon bisulfide plus tars obtained by the concentration of carbon bisulfide containing tars are charged. The resulting composition comprises about 304 parts by weight of carbon bisulfide plus 70 parts by weight of tars. The reaction mixture is heated to 245° C. and held there with agitation for about 5 hours. The autoclave and contents are then cooled to obtain 614 parts by weight of mercaptobenzothiazole of 87% assay. After purification as described in Example 1 there is obtained 490 parts by weight of 99% mercaptobenzothiazole.

The results from a series in which carbon bisulfide liquors are recycled are summarized in the table below. The charges of aniline and sulfur refer to fresh reactants. The reduction of material charged in the recycling was based upon analysis of the carbon bisulfide liquors. Thus, in the first recycle the tars charged with fresh aniline were equivalent to 31 parts by weight of aniline calculated by the method hereinabove explained. The tars were also equivalent to 6 parts by weight of sulfur. Accordingly, the fresh aniline and sulfur were reduced to 279 parts by weight and 103 parts by weight respectively. The carbon bisulfide in the recycle runs was that charged with the tars plus any fresh material required to total 304 parts by weight. The yields reported are cumulative yields based on the total fresh aniline charged. All parts are by weight.

|  | Initial Run No recovered Material Used | First Recycle | Second Recycle |
|---|---|---|---|
| Aniline charged | 310 | 280 | 270 |
| Sulfur charged | 109 | 103 | 98 |
| Carbon bisulfide charged | 304 | 304 | 304 |
| Weight of crude | 568 | 617 | 614 |
| Assay crude mercaptobenzothiazole, percent | 87 | 87.2 | 86 |
| Cumulative yield, percent | 88.5 | 97 | 100 |
| Assay purified mercaptobenzothiazole, percent | 99.5 | 99.4 | 97.4 |
| Assay purified sulfur, percent | 0.1 | 0.3 | 0.8 |

The mercaptobenzothiazole assay is determined in the usual way by titration with standard caustic solution. Approximately a 0.6 gram sample is weighed and washed with a neutralized solvent mixture composed by volume of 50% acetone, 25% alcohol and 25% water. Before use the solvent mixture is neutral to phenolphthalein. The solution of mercaptobenzothiazole is then titrated with 0.1 N sodium hydroxide. The error of this method is about ±.5%. The combination of sampling and analytical error reduces the precision to ±.7%. Nitrogen and sulfur in the tars are also determined by standard techniques. The polarographic method for free sulfur gives excellent results and is preferred.

Example 3

The process of Example 2 is repeated to obtain 614 parts by weight of crude mercaptobenzothiazole of 87% assay. The autoclave is recharged with 100 parts by weight of crude product, 400 parts by weight of water, 40 parts by weight of carbon bisulfide and 1 part by weight of nonionic emulsifier. The mixture is stirred in the closed autoclave at 75-100° C. for about two hours, then cooled, filtered and the filter cake washed with a little carbon bisulfide, then with cold and finally with warm water. The assay of mercaptobenzothiazole is 95%, benzothiazole 0.6% and sulfur 0.4%.

Alternatively, almost pure mercaptobenzothiazole is obtained by extracting the crude product with carbon bisulfide as the purification step but this requires much higher quantities of carbon bisulfide and necessitates concentration of the liquor. Finely ground mercaptobenzothiazole, 1 part, is agitated with 2.5 parts carbon bisulfide at reflux temperature, filtered and the cake washed with carbon bisulfide. The dry product assays 99.5% mercaptobenzothiazole and 0.1% sulfur. Using flaked crude mercaptobenzothiazole the assay is 1% lower and sulfur content 0.4%. The carbon bisulfide liquors are concentrated and then the residue analyzed and recycled as described.

The method of recovering the tars may vary from the procedures described to illustrate the invention. The tars are fluid difficultly crystallizable materials so that drainage from the crystalline crude mass without chemical adjuvants is feasible. This procedure, known as static crystallization, involves slowly cooling the crude reaction mixture. The mercaptobenzothiazole slowly crystallizes and the tars simply drip or drain off during the crystallization. The tars drained off are recycled to obtain further quanities of mecaptobenzothiazole as described. However, pumping the tars and other operations involved in recycling are greatly simplified by having them in carbon bisulfide solution.

It is intended to cover all changes and modifications of the examples of the invention herein chosen for purposes of disclosure which do not constitute departures from the spirit and scope of the invention.

What is claimed is:

In a process for the manufacture of mercaptobenzothiazole by heating aniline, sulfur and carbon bisulfide under pressure to form mercaptobenzothiazole and separating mercaptobenzothiazole from the crude reaction product without use of reagents reacting therewith, the step of recycling the residue containing by-product tars to the reactor together with aniline, sulfur and carbon bisulfide in the amount required, based upon the aniline and sulfur equivalent of the residue, to equal the initial charge, and heating to form additional mercaptobenzothiazole.

References Cited in the file of this patent

UNITED STATES PATENTS

| | | |
|---|---|---|
| Re. 19,478 | Hale | Feb. 26, 1935 |
| 1,631,871 | Kelly | June 7, 1927 |
| 1,932,518 | Hale | Oct. 31, 1933 |
| 2,117,120 | Smith et al. | May 10, 1938 |
| 2,567,146 | Cooper et al. | Sept. 4, 1951 |
| 2,631,153 | Paul et al. | Mar. 10, 1953 |
| 2,658,864 | Ebel | Nov. 10, 1953 |
| 2,659,753 | Plump | Nov. 17, 1953 |